(12) United States Patent
Bernsen et al.

(10) Patent No.: US 10,076,015 B2
(45) Date of Patent: Sep. 11, 2018

(54) LUMINAIRE WITH RADIO MODULE

(71) Applicant: PHILIPS LIGHTING HOLDING B.V., Eindhoven (NL)

(72) Inventors: Johannes Arnoldus Cornelis Bernsen, Eindhoven (NL); Walter Dees, Eindhoven (NL); Maurice Herman Johan Draaijer, Ittervoort (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/501,021

(22) PCT Filed: Jul. 31, 2015

(86) PCT No.: PCT/EP2015/067684
§ 371 (c)(1),
(2) Date: Feb. 1, 2017

(87) PCT Pub. No.: WO2016/016435
PCT Pub. Date: Feb. 4, 2016

(65) Prior Publication Data
US 2017/0223810 A1      Aug. 3, 2017

(30) Foreign Application Priority Data
Aug. 1, 2014    (EP) .................................... 14179518

(51) Int. Cl.
*H05B 37/02* (2006.01)
*H04B 10/116* (2013.01)
(Continued)

(52) U.S. Cl.
CPC ....... *H05B 37/0272* (2013.01); *H04B 10/116* (2013.01); *H04L 63/062* (2013.01); *H04W 12/04* (2013.01); *H05B 37/0227* (2013.01)

(58) Field of Classification Search
CPC ............ H05B 37/0272; H05B 37/0227; H04B 10/116; H04L 63/062; H04W 12/04
(Continued)

(56) References Cited

U.S. PATENT DOCUMENTS 7,531,972 B1 *   5/2009  Worsham ................ F21S 8/033
                                                          318/16
2001/0052880 A1 * 12/2001 Kuramoto ............ H01Q 1/3233
                                                          343/713
(Continued)

FOREIGN PATENT DOCUMENTS

EP           2043301 A1     1/2009
WO        2010140136 A1    12/2010
(Continued)

OTHER PUBLICATIONS

Armstrong, Jean, et al., "Visible Light Positioning: A Roadmap for International Standardization," Visible Light Communications: The Road to Standardization and Commercialization, IEEE Communications Magazine, Dec. 2013 (6 Pages).

*Primary Examiner* — Don Le
(74) *Attorney, Agent, or Firm* — Meenakshy Chakravorty

(57) ABSTRACT

In one aspect there is provided a luminaire (100) comprising: a light source (104) operable to emit a beam of light; and a radio module (106) operable to emit a radio beam comprising a radio signal, using a frequency band of 60 GHz; wherein the light source (104) and radio module (106) are operable to emit the light beam and radio beam so as to be substantially coincident in space. According to another aspect, there is provided a method comprising using a spatial extent of the light beam to indicate an approximate spatial extent of the radio beam, or vice versa using a spatial extent of the radio beam to indicate an approximate spatial extent of the light beam.

14 Claims, 1 Drawing Sheet

(51) Int. Cl.
*H04W 12/04* (2009.01)
*H04L 29/06* (2006.01)

(58) Field of Classification Search
USPC .......................................... 315/129
See application file for complete search history.

(56) References Cited

U.S. PATENT DOCUMENTS

| | | |
|---|---|---|
| 2004/0242290 A1 | 12/2004 | Keeling |
| 2008/0204280 A1* | 8/2008 | Reason ................... B64F 1/002 340/955 |
| 2008/0220729 A1 | 9/2008 | Avila |
| 2011/0241529 A1 | 10/2011 | Matsui et al. |
| 2011/0249441 A1* | 10/2011 | Donegan ............ H05B 33/0803 362/253 |
| 2012/0218978 A1* | 8/2012 | Ishidoshiro ......... F21V 33/0052 370/338 |
| 2012/0274208 A1 | 11/2012 | Chen et al. |
| 2013/0039035 A1* | 2/2013 | Harkam ................ F21V 29/004 362/95 |
| 2013/0121390 A1 | 5/2013 | Chang |

FOREIGN PATENT DOCUMENTS

| | | |
|---|---|---|
| WO | 2011057343 A1 | 5/2011 |
| WO | 2014026456 A1 | 2/2014 |

\* cited by examiner

LUMINAIRE WITH RADIO MODULE

CROSS-REFERENCE TO PRIOR APPLICATIONS

This application is the U.S. National Phase application under 35 U.S.C. § 371 of International Application No. PCT/EP2015/067684, filed on Jul. 31, 2015, which claims the benefit of European Patent Application No. 14179518.7, filed on Aug. 1, 2014. These applications are hereby incorporated by reference herein.

TECHNICAL FIELD OF THE INVENTION

The present disclosure relates to an Extremely High Frequency (EHF) radio module being incorporated into a luminaire.

BACKGROUND OF THE INVENTION

IEEE 802.11ad is an extension to the Wi-Fi wireless standard that uses a 60 GHz radio frequency (RF) band. The frequency band is 56-64 GHz in the US, and 56-66 GHz in Europe. It allows digital data to be transmitted over a link at rates of multiple gigabits per second.

One issue with 60 GHz technology is that 60 GHz Wi-Fi modules have a very different range than Wi-Fi a/b/g/n modules. This is due to the much shorter wavelength of the signals (5 mm) and the high absorption by air for 60 GHz RF. Furthermore, many materials either reflect 60 GHz RF (e.g. most building materials such as metal, concrete, or wood) or absorb 60 GHz RF (e.g. the human body).This means that the effective range of 60 GHz signals with the allowed RF power output is of the order of several meters at most. But in order to make even that range possible, beam forming has to be used, i.e. the 60 GHz antenna system must be directional, and there must be a line-of-sight path between transmitter and receiver. Directionality is achieved by separately setting the gain and phase to/from each antenna (for transmitting/receiving respectively). These coefficients can also be set such that a less directional or even quasi-omnidirectional transmit/receive pattern is obtained. The noise margin is less when using a less narrow beam, but that can be compensated for by lowering the bit rate (i.e. use symbols of longer duration and/or use less symbols, e.g. 16 QAM instead of 64 QAM).

US 2012/0274208 discloses a lighting device which includes a radio transceiver chip, and discloses that one band which may be used for radio communications (amongst others) is a 60 GHz band. The radio transceiver is mostly used to receive control signals from a remote control, but can also be used so that the lighting device can transmit "tele management" signals to other lighting devices in the vicinity. Nonetheless, US 2012/0274208 fails to recognize any particular usefulness of the 60 GHz band over and above any other radio band in the context of lighting.

SUMMARY OF THE INVENTION

The following disclosed techniques exploit an observation that, because of its frequency, 60 GHz RF has similar propagation properties to visible light. This means that if a 60 GHz radio module such as a 60 GHz Wi-Fi module is incorporated into a luminaire, the radio beam can be arranged to substantially match to the light in terms of its spatial extent and line-of-site properties. As mentioned, in the US the 60 GHz Wi-Fi band is 56-64 GHz and in Europe it is 56-66 GHz (and the RF signal may use part of whole of that band). However, other ranges are possible, e.g. a 60 GHz band of width 50-70 with the signal using any part of the whole of that band. In fact, more generally, the observation and properties of GHz RF exploited herein can apply to any RF radiation that falls within the Extremely High Frequency (EHF) range, which is 30-300 GHz (EHF is an ITU definition).

According to one aspect of the present disclosure, there is provided a luminaire comprising: a light source operable to emit a beam of light; and a radio module operable to emit a radio beam comprising a radio signal, occupying a frequency band that falls within a range of 30 GHz to 300 GHz (i.e. using at least part of this range). The light source and radio module are operable to emit the light beam and radio beam so as to be substantially coincident in space. When provided from the factory, the modules may be provided having a beam-forming capability with sufficient freedom to be operable to create this spatial relationship; and when installed, the modules may be set up so as to indeed be arranged with this spatial relationship. In embodiments there may comprise a lighting system comprising a system of such luminaires.

According to another aspect disclosed herein, there is provided a method of operating a luminaire, comprising: operating a light source of the luminaire to emit a beam of light; operating a radio module of the luminaire to emit a radio beam comprising a radio signal, using a frequency band that falls within a range of 30 GHz to 300 GHz; and using a spatial extent of the light beam to indicate an approximate spatial extent of the radio beam, or vice versa using a spatial extent of the radio beam to indicate an approximate spatial extent of the light beam.

According to one aspect of the present disclosure, there is provided a lighting system comprising one or more luminaires, each comprising: a light source configured to emit a beam of light; and a radio module configured to emit a radio beam comprising a radio signal, using a frequency band that falls within a range of 30 GHz to 300 GHz. The light source and radio module are arranged to emit the light beam and radio beam so as to be substantially coincident in space. In embodiments there may comprise a lighting system comprising a system of such luminaires.

Optionally, the light source and radio module may be arranged so that the light beam and the radio beam are moved in unison, and/or the light source and radio module may be operable to change the light beam distribution and the radio beam distribution in unison.

Further, in embodiments a preferred distribution of the radio modules (e.g. Wi-Fi access points) for 60 GHz (or more generally EHF) communication matches with that of the luminaires. Moreover, the luminaires tend to have a good position in terms of real-estate within a user's environment (e.g. an office or the like).

There are a number of applications of these ideas. For instance, as one example, in embodiments: (a) the radio module may be configured to emit the radio signal so as to comprise information about the light source, the light beam and/or the light; and/or (b) the light source may be configured to use the light beam to provide visual or embedded information about the radio module, the radio beam and/or the radio signal. wherein the method comprises receiving said information from the radio signal and/or light beam respectively E.g. said information may comprise one or more of: information for use in commissioning a lighting system comprising the luminaire, and/or an indication that the light beam is about to switch off within a predetermined time window. Alternatively or additionally, the information provided by the light beam may comprises one or more of: information for use in commissioning a communication system comprising the radio beam, information about the quality of the radio beam, whether the radio beam is currently available, and/or a password and/or cryptographic information required for a user device to access a network via the radio module.

As another example, in embodiments there may be provided a method of commissioning a lighting system comprising a plurality of luminaires each operated as stated above. The commissioning method comprises determining an approximate distribution of the radio modules and/or radio beams based on a detected distribution of the light beams, or determining an approximate distribution of the light sources and/or light beams based on a detected distribution of the radio beams. For instance, this can be used to set up a 60 GHz (or EHF) wireless infrastructure with sufficient coverage to allow devices within a certain environment (e.g. an office) to access the Internet and/or an intranet via the 60 GHz (or EHF) modules.

As another example, the light beam or beams may be taken as indicative of where 60 GHz radio coverage is also available, e.g. for accessing a network such as the Internet or an intranet. A user then need only move his or her mobile device to a position approximately within the light beam in order to find a location with suitable 60 GHz (or EHF) RF coverage for establishing a connection with the radio module.

In another example, the 60 GHz (or EHF) transceiver may also be used as presence detector. Hence in embodiments, the light beam may be arranged to illuminate a region; and the system may comprise a controller configured to detect presence in the region based on the radio beam, and to control the light beam in dependence on the detected presence. Thus presence detection based on 60 GHz (or EHF) can be made synergetic with the illumination, in that the illuminated region (e.g. the workspace) is approximately the same region in which presence is of interest, and the 60 GHz (or EHF) RF signal used for presence detection also covers approximately the same region. I.e. the presence region is approximately the same as the lighted area, with presence being detected in that region so as to control the light in that same region.

In yet another example, the light beam may be arranged to illuminate a region, and the 60 GHz (or EHF) radio signal provides information about the illuminated region. For instance, the information provided by the radio beam may comprise information about an occupancy and/or reserved occupancy of the region (e.g. a user has claimed a certain desk or other workspace); or the region may comprise a product display including a product illuminated by the light beam, and the information provided by the radio beam comprises information about the illuminated product. E.g. the luminaire module may be used to create a narrow beam that acts as a spot light on an item to be highlighted, while the 60 GHz Wi-Fi module may be configured to broadcast data about the item which can be received and viewed through a portable device with a 60 GHz radio receiver. Thus this information will only be presented if the portable device is within the 60 GHz beam, and so only if suitably close to the item to be highlighted.

BRIEF DESCRIPTION OF THE DRAWINGS

To assist the understanding of the present disclosure and to show how embodiments may be put into effect, reference is made by way of example to the accompanying drawings in which.

DETAILED DESCRIPTION OF EMBODIMENTS

Figure 1:
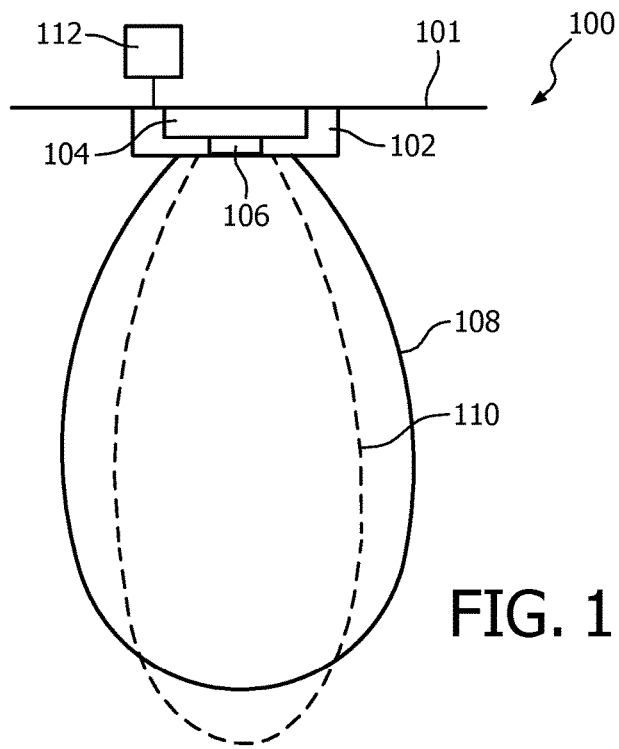
FIG. 1 is a schematic illustration of a luminaire emitting a light beam and a radio beam.

FIG. 1 illustrates an example of a luminaire 100 in accordance with embodiments of the present disclosure. The luminaire (i.e. light fixture) 100 comprises a housing 102, a light source 104, and an electrical and a mechanical interface for integrating a radio module 106 into the luminaire 100; wherein the housing 102 at least partially contains, protects and/or supports the light source 104 and radio module 106. Thus the light source 104 and radio module 106 form part of the same luminaire 100. The luminaire 100 may for example be mounted on a suitable surface 101 such as the ceiling, or may be mounted on a light pole, or may be free-standing.

The light source 104 comprises one or more constituent lighting elements, e.g. LEDs. It is configured to emit visible light in the form of a light beam 108, i.e. the light is directional as opposed to omnidirectional. For example, the luminaire 100 may take the form of a spotlight illuminating a work surface such as a desk, or may be arranged to illuminate a certain area of a room or outdoor space (e.g. corresponding to a certain spot on the floor or ground). The light beam 108 may be formed using any known techniques for directing light, and may take any shape such as a cone or lobe. For instance the light beam 108 may be formed by means of one or more reflectors and/or lenses to direct the emitted light in certain desired direction light, and/or one or more opaque barriers or block the emitted light in certain unwanted directions.

Further, the radio module 106 is configured to emit a radio signal in the form of a radio beam 110. The radio beam may be formed using any known beam-forming techniques for radio beams, such as by means of an antenna array based on constructive and destructive interference, and/or by means of surrounding shielding to block the radio in unwanted directions. The radio beam 110 may also take any shape, such as a cone or lobe.

The radio beam 110 is an EHF beam which uses one or more frequencies within the EHF band, e.g. a 60 GHz band with a width 50-70 GHz. In embodiments the radio beam is a 60 GHz Wi-Fi beam in accordance with IEEE 802.11ad, and may be described as such in the following. However, it will be appreciated that the propagation properties of any 60 GHz RF radiation will be similar, and therefore the teachings of the present disclosure may also apply more generally to any communications standard using a 60 GHz band. In fact, while a 60 GHz band will be referred to in the following by way of illustration, the teachings below may be extended to any EHF (30-300 GHz) band.

In some embodiments, the radio module 106 is also operable to receive radio signals on the 60 GHz band (or more generally EHF band). The received signals need not take the form of a beam (though that is not excluded either). For example, the radio module 106 may be configured to allow a user device to establish a connection with the radio module 106, e.g. the radio module 106 being arranged to act as an access point (AP) allowing a mobile user device to access a communication network such as the Internet or an intranet via the radio module 106. Note however that while embodiments may be described in terms of APs such as Wi-Fi APs, more generally the radio module 106 does not necessarily provide an AP in all possible embodiments. E.g.

the Wi-Fi Alliance, the industry body that is responsible for certification of Wi-Fi devices, has specified other devices that provide similar functionality but that are also somewhat different from APs. Wi-Fi Direct devices, Wi-Fi Docking Centre devices and Directional Multi-Gigabit (DMG) devices are a few examples. Therefore where APs are referred to below, it will be appreciated that in embodiments the disclosed techniques may also apply in relation to other such radio devices.

Note also that where it is said that the beam uses a certain band, or the like, any given signal that is transmitted or received on that band does not necessarily use the whole band, and may in general use any one or more frequencies over parts or the whole of the band in question.

The light source 104 and/or radio module 106 may be coupled to at least one controller 112, which may govern the various described functions of the light source 104 and/or radio module 106. For example, the at least one controller 112 may be configured to switch either or both of the beams 108, 110 on and off; to control the output intensity, direction, width and/or shape of either or both beams 108, 110; to control the signal conveyed by the radio beam; to control the radio module 106 to receive signals (e.g. to establish a connection with a device, such as to provide Internet or intranet access); and/or to control the light source 104 to convey a visible or embedded (coded light) signal in the emitted light. In embodiments, a controller 112 of the light source 104 is configured to receive information from the radio module 106, and/or a controller 112 of the radio module 106 is configured to receive information from the light source 104.

Where any such functions are mentioned in the following, it will be understood that these may be performed under the control of the at least one controller 112. The at least one controller 112 may be a local controller incorporated into the luminaire 100 (in the same housing), or may be external to it (e.g. over a wired or wireless lighting network), or a combination of such options. The at least one controller 112 may comprise a common controller for both light source 104 and radio module 106, or separate controllers for each respectively. The at least one controller 112 may be implemented in software stored on one or more computer-readable storage media and arranged for execution on one or more processors, or may be implemented in dedicated hardware circuitry, or configurable or reconfigurable hardware circuitry such as an PGA or FPGA, or any combination of these options.

The light source 104 and radio module 106 are arranged together within the luminaire 100 such that, when they emit, the light beam 108 and radio beam 110 will be substantially coincident in space. The light beam 108 and radio beam 110 need not be exactly the same size or shape, but are "substantially" coincident at least in that the one of the beams gives some indication of the spatial extent of the other for practical purposes, whether this be an exact indication or an approximate indication.

E.g. the radio beam may be formed into a desired width or shape by using an array of antennas, and controlling the signal to/from each of the different antennas (for transmit/receive respectively) independently in amplitude and phase. The parameters to use to 'steer' the radio beam 110 in the direction(s) and beam width(s) of the light source 104 may be calibrated after manufacture, so that it is known how to make the beam coincident. Alternatively or additionally, the light beam 108 may be formed into a desired shape by means of equivalent elements that one can use to make light beams directional, such as (shaped) mirrors, lenses, zone plates and/or other diffraction patterns, etc.

In embodiments, the light beam and radio beam are arranged to be substantially coincident in that one or more of:
- the light beam and radio beam have parallel axes;
- by solid angle, the intersection of the light beam and the radio beam is at least 50% of the solid angle of the radio beam and at least 50% of the solid angle of the light beam;
- by solid angle, the intersection of the light beam and the radio beam is at least 25% of the solid angle of the radio beam and at least 25% of the solid angle of the light beam;
- by solid angle, the intersection of the light beam and the radio beam is at least 10% of the solid angle of the radio beam and at least 10% of the solid angle of the light beam;
- by cross-sectional area in a plane perpendicular to the axes of the beams, or by area on a surface upon which both beams are incident (e.g. the floor, or a desk or other work surface), the intersection of the light beam and radio beam (the area that is covered by both beams) is at least 50% of the area of the radio beam and at least 50% of the area of the light beam;
- by cross-sectional area in a plane perpendicular to the axes of the beams, or by area on a surface upon which both beams are incident, the intersection of the light beam and radio beam is at least 25% of the area of the radio beam and at least 25% of the area of the light beam;
- by cross-sectional area in a plane perpendicular to the axes of the beams, or by area on a surface upon which both beams are incident (e.g. the floor, or a desk or other work surface), the intersection of the light beam and radio beam is at least 10% of the area of the radio beam and at least 10% of the area of the light beam; and/or
- in a plane perpendicular to the axes of the beams or on a surface which upon both beams are incident (e.g. the floor or a work surface), one of the light beam and the radio beam falls entirely within the area of the other.

The solid angle of an EM beam may be defined as the entire solid angle in which the power per unit solid angle of the directional (or angular) radiation is not less than 3 dB below the maxim power per unit solid angle of the directional (or angular) radiation (50% of power is −3 dB). The cross-sectional or perpendicular area of a beam can be defined as the area in which the surface power density or the power per unit area of the radiation in the beam is not less than 3 dB below the maxim surface power density or the power per unit area of the radiation in the beam.

Furthermore, in embodiments, the light source 104 and radio module 106 may be arranged together within the luminaire 100 such that, if one of the light beam 108 and the radio beam 110 is moved, then the light beam 108 and radio beam 110 will move in unison. I.e. the light source 104 and radio module 106 are operable to move the light beam 108 and radio beam 110 respectively, and are arranged so that when the light beam 108 is moved then the radio beam 110 automatically moves with the light beam, and/or when the radio beam 110 is moved then the light beam automatically moves with the radio beam, thereby retaining said substantial coincidence in space despite said movement.

For example, the light source 104 may be mounted on the same moveable mounting of the housing 102 as the radio module 106 (including any reflectors, barriers, shielding or the like involved in forming the beam), so that the two beams are mechanically constrained to moving together. As another example, one or each of the light source 104 and radio module 106 may be mounted on its own individual movable mounting (including any reflectors, barriers, shielding or the like involved in forming the beam), which can be moved by means of an electro-mechanical actuator. As another alternative, when using an antenna array for the radio beam-forming, the phases and/or amplitudes of the individual antennas may be adjusted in order to electronically direct the radio beam in response to any detected movement of the light source 104 or its beam 108. And/or, the light source 104 may comprise a plurality of constituent lighting elements (e.g. LEDs) which may be switched on and off or dimmed in different combinations to create different beams. Any of the above techniques or others may be used to automatically adjust one of the beams 108, 110 in response to movement of the other.

In one embodiment, the light source 104 is an optical spotlight and the direction of the 60 GHz beam 110 is obtained from the direction in which the optical spot light is aimed. It may be desirable to combine the logic/circuitry driving the optical spot light (which may include a mechanism to control the direction is pointing towards) together with the logic/circuitry driving the 60 GHz module 106, so the 60 GHz module can determine the angle from the spot light and hence derive which area it is illuminating, and can form a 60 GHz beam directed at the same location. Alternatively, a camera can be used to detect the illuminated area or item, the data of which can be used to direct the 60 GHz beam. In a second embodiment, the 60 GHz beam can be configured to be directed to a desired spot by placing a second 60 GHz module (not shown) at the desired spot (inside or near the desired spot or holding a portable device close to the item) and setting up a link with the first 60 GHz module 106 to be configured. The direction of the 60 GHz beam may be pre-configured based on such a mechanism, or arranged to dynamically track the spot based on the mechanism. For example, a command is given to the first 60 GHz module 106 to remember the setting of the antenna array for the link with the second 60 GHz radio, since the beam used for this connection is directed in an optimal fashion.

In further embodiments, the light source 104 and radio module 106 may be operable to change the light beam distribution and the radio beam distribution in unison. For instance the light source 104 and radio module 106 may be operable to emit the light beam 108 and radio beam 110 respectively each in at least a narrow beam mode and a wide beam mode, and may be arranged so that when the light beam 108 is switched to the narrow beam mode the radio beam 110 automatically switches to the narrow beam mode, and/or when the light beam 108 is switched to the wide beam mode the radio beam 110 automatically switches to the wide beam mode, and/or when the radio beam 110 is switched to the narrow beam mode the light beam 108 automatically switches to the narrow beam mode, and/or when the radio beam 110 is switched to the wide beam mode the light beam 108 automatically switches to the wide beam mode, thereby retaining said substantial coincidence in space despite the switching.

For example, the width of the light beam 108 may be controlled by adjusting one or more reflectors and/or visible barriers of the light source 104 via an electro-mechanical actuator, or turning on or off one or more constituent lighting elements (e.g. LEDs) of the light source 104. And/or the width of the radio beam 110 may be controlled by adjusting the phases and/or amplitudes of the individual antennas in the antenna array, or by adjusting surrounding shielding via an electro-mechanical actuator. Any of these techniques or others may be used to automatically change the width or more generally distribution of one beam in response to a change in the width or distribution of the other.

A number of exemplary applications of the luminaire 100 are now discussed. One such application lies in the installation and commissioning of 60 GHz data communication modules. In modern offices, apart from taking care that there is enough light on each working place or desk, one must also take care that each working place can be connected to the internet and or corporate intranet with sufficient bandwidth. The latter means more and more the installation of Wi-Fi Access Points (APs). Conventional access points (APs) of a Wi-Fi a/b/g/n wireless local area network (LAN) are usually installed in corridors. That works fine, because the signals involved do penetrate walls and the ceiling of corridors is usually quite accessible for installation work. These modules can also be hidden behind the ceiling if an aesthetically pleasing ceiling is desired.

However, if one wants to install 60 GHz access points or 60 GHz peer-to-peer modules in an office environment and provide every work place with 60 GHz Wi-Fi access, the desired place to install these modules is not as usual in the corridor, but above every desk, or at least above each group of desks with a clear line of sight to each desk.

In fact, since 60 GHz connection typically requires line of sight between sender and receiver, it becomes a quite difficult task to install sufficient 60 GHz modules to create a wireless infrastructure with good coverage of the 60 GHz signals, such as may be required in order to provide gigabit wireless connectivity to the Internet or an intranet for mobile and/or stationary devices in an office space or the like.

However, according to embodiments of the present disclosure, since the reflections and absorption of 60 GHz signals share similar characteristics as to visible, then sufficient coverage of light in an office lighting infrastructure corresponds to sufficient coverage of 60 GHz and vice versa.

By integrating a 60 GHz module such as a 60 GHz access point or peer-to-peer device in a luminaire 100, the problem of setting up a 60 GHz wireless infrastructure can be greatly alleviated. This may provide one or more of the following advantages.

For instance, one of the main objectives of luminaire installation is to ensure that there is enough light on each work place. In many countries this is even required by law. By the nature of the similarities between light and 60 GHz RF, and given the co-arrangement of the two as disclosed herein, then installing luminaires or rather positioning luminaires to achieve the desired distribution will also take care of the correct positioning of 60 GHz modules for unobstructed communication with the laptops, smart phones, etc. used by the workers. I.e. if a luminaire 100 is arranged to provide the correct illumination of a work space (or the like), then the 60 GHz radio coverage will also be provided in roughly the same region as the light. E.g. in an office setting, one can accomplish with an integrated light source/60 GHz AP that the one or a few co-located workplaces that are illuminated by the light source with sufficient light also are 'illuminated' by the 60 GHz AP, such that these workplaces have a wireless network connection with gbps bandwidth, with reduced interference from non-illuminated (by RF) work places.

More generally, the fact that the visible light and 60 GHz RF have substantially similar origins and propagation, means that the distribution of the light can be taken as an indication of the approximate distribution of the 60 GHz RF coverage, and so can be used to help determine the 60 GHz RF coverage during commissioning. The light distribution may be checked by eye, or using mobile device 200 as illustrated in FIG. 2.

Figure 2:
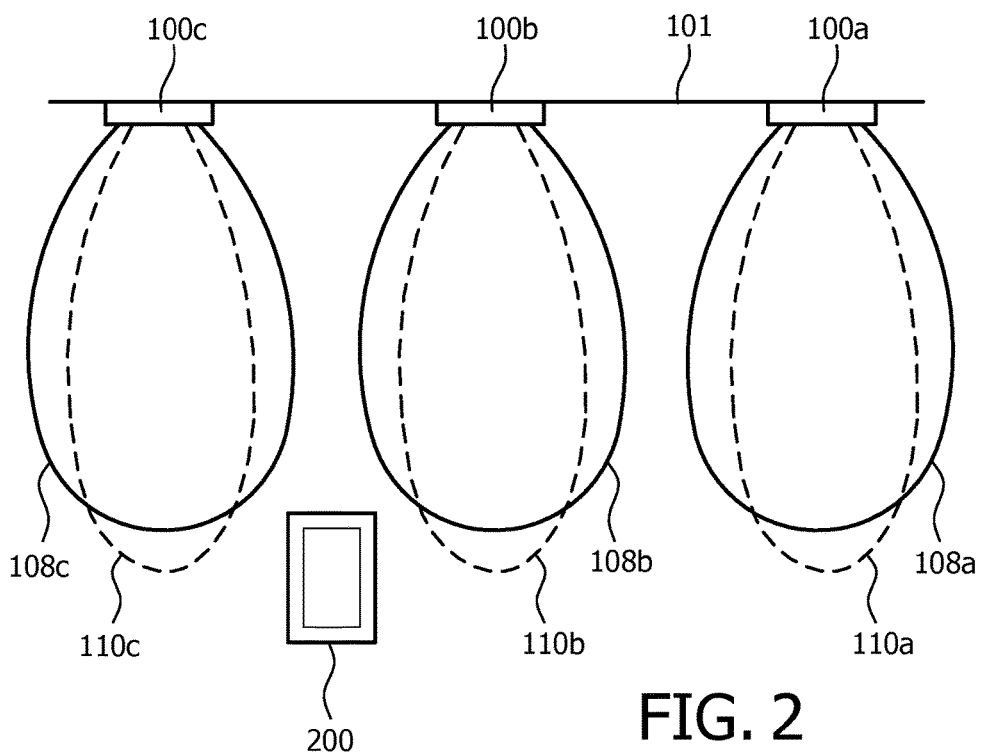
FIG. 2 is a schematic illustration of a lighting system comprising a plurality of luminaires, each emitting a respective light beam and radio beam.

FIG. 2, a lighting system in an environment such as an office comprises a plurality of luminaires 100a, 100b, 100c each configured as discussed in relation to FIG. 1. Thus, each luminaire 100a, 100b, 100c emits a respective light beam 108a, 108b, 108c and a respective 60 GHz radio beam 110a, 110b, 110c, each having a substantially similar origin and extent as its respective light beam. Thus light and 60 GHz Wi-Fi coverage is provided with a certain distribution throughout the environment, due to the placement of the multiple luminaires 100a, 100b, 100c. The commissioning user has a portable device 200 with a camera or light sensor which he or she places at one or more locations or points towards one or more scenes in the environment in question, e.g. the office space. The device 200 measures the intensity of the light at each location, or captures an image of each scene, and thereby detects where light falls and/or with what intensity. As the light coincides with the 60 GHz RF, the commissioning user can assume that sufficient illumination coverage corresponds approximately with sufficient 60 GHz RF coverage, and so does not need to separately commission the 60 GHz Wi-Fi infrastructure.

Alternatively or additionally, commissioning may be simplified by allocating shared or corresponding configuration data (e.g. addresses) to the light source 104 and the radio module 106, such that the configuration data or that the configuration data of one can be determined from that of the other.

Lights have to be controlled, and more-and-more that is done not by hard-wired switches, but by sending signals containing commands to the lamps. That means that the lights need to have an electronic address but also that the location of the light has to be known and what working space(s) it covers. Only then is it possible to switch the light over working place X on or off or set it to the right level, color, etc. Therefore during commissioning of a luminaire, the location and network address of the luminaire have to be determined, such that the luminaire can be controlled by the correct wall switches and/or the building automation system. Also, the lights may emit coded light. If that is used for location-based services, the exact location of the light needs to be known. All of this has to be determined during commissioning.

Further, when installing an access point (AP), it may also be important that it is known at which location it is positioned and which address it has (e.g. which IP address). The location is important, because one want to assign a channel to each AP such that there is least interference with neighboring APs.

According to embodiments disclosed herein, the commissioning of an integrated AP/light source can be simplified, because the location of both are the same (or have a small, but know offset if one needs the location very precisely). It can be further simplified, because the electronic address (e.g. its IP address) of the light source (for controlling it, etc.) can be derived from the IP address of the integrated AP. For example, it may be 1 higher than the IP address of the IP. E.g. the luminaire would have an Ethernet connection to the enterprise intranet and the AP would have address x.y.z.1 and the light source x.y.z.2.

Hence in embodiments, the same commissioning system as used for the lighting can be used to obtain data on the 60 GHz modules present in the luminaires and be presented as input for the frequency allocation plan for the 60 GHz modules and to determine the exact location of the 60 GHz module within the office space. No separate commissioning step is needed. For example, in embodiments the light source 104 of each luminaire 100a, 100b, 100c is arranged to emit its respective light modulated with a different respective coded-light signal (at a frequency higher than can be perceived by the human eye). Each signal corresponds to a respective identifier of the respective luminaire 100a, 100b, 100c, which can be used to address the respective light source. This can also be used to address the respective RF modules, or to look-up the addresses of the RF modules in a database mapping luminaire or light source addresses to RF module addresses.

Vice versa, a mobile device 200 with an integrated 60 GHz module may be used to commission the lights without using coded light.

Thus it can be seen that the disclosed arrangement enables various advantageous commissioning techniques, such as: (i) determining an approximate spatial distribution of the radio beams 110a, 110b, 110c based on a detected spatial distribution of the light beams 108a, 108b, 108c; (ii) determining a distribution of addresses and/or locations of the radio modules 106 based on a detected distribution of information provided by the light beams 108a, 108b, 108c; or (iii) determining a distribution of addresses and/or locations of the light sources 104 based on a detected distribution of the radio signals in the radio beams 110a, 110b, 110c.

Further, the network cable used for a power-over-Ethernet luminaire can be used to connect the 60 GHz module to the network and can also power it. This means that no separate Ethernet or other cables would have to be installed to enable the backend wired Ethernet infrastructure for the 60 GHz wireless infrastructure.

An additional benefit of integrating a 60 GHz module in a luminaire is that in there is no need to have separate 60 GHz modules hanging below the ceiling. Separate 60 GHz modules (e.g. with integrated antenna array) must be below the ceiling due to the line of sight issue, making the appearance of the ceiling less nice. With OLED panel lighting in the ceiling, it may not even be possible from a practical or aesthetical point of view to install 60 GHz modules below the ceiling. However, by integrating the 60 GHz module/antenna in the luminaire, the location of the 60 GHz module can be chosen such that: the luminaire keeps the same (aesthetic) appearance, the lighting pattern from the luminaire is unobstructed, and/or the downward 60 GHz radiation experiences negligible absorption by the luminaire when the 60 GHz module is added to the luminaire.

The various features discussed above mean that it can become very simple to commission 60 GHz modules in an environment where the luminaires have an electrical and mechanical interface integrated for 60 GHz modules or 60 GHz antenna. In embodiments, no new cabling is needed, there are no lighting pattern changes, no aesthetic changes, and the data network already knows the location of 'the other end' of each network cable that is connected to a luminaire—so the installer can just "click & go".

Another exemplary application of the luminaire 100 disclosed herein lies in presence detection (i.e. detecting presence of a user).

For instance, office spaces are usually equipped with presence detectors to enable automatic switching off of the lights when no-one is present in the office space (to conserve energy), and to enable automatic switching on of the lights when a person is detected. They may also cause the heating, cooling, and blinds systems to be controlled appropriately when people are present and not present. These presence detectors (e.g. pyroelectric infrared sensors or microwave sensors) typically do not detect presence of people, but rather motion. This means they often cause the lights (or heating, etc.) to be switched off, even when there are people present (e.g. when people sit very still whilst working or on the toilet); and also often cause false positives (e.g. when people walk past an office space the lights may switch on). This causes annoyance and frustration with workers and may even lead to workers 'hacking' the presence detectors, which then nullifies potential energy savings of the 'presence' detectors. It is also not very cost effective to install these presence detectors in every office space.

Due to the characteristics of 60 GHz signals, its reflection and absorption in materials, and beam-forming mechanisms typically present in 60 GHz modules, several additional methods can be deployed to detect presence ranging from simple methods such as using the 60 GHz connection with a person's mobile phone, to more complex possibilities of using breathing detection. Given the short wavelength of the signals (5 mm) and given sensitive enough devices even the motion of a beating heart can be detected (see Microwave and Optical Technology Letters/Vol. 51, No. 3, March 2009 "Noncontact heartbeat detection at 2.4, 5.8 and 60 GHz: a comparative study" by D. Obeid et al).

Deploying one or more of these presence detection methods offered by a 60 GHz module will reduce the number of false positives and reduce the need to install separate presence detectors to control the lights. One can simply use an integrated 60 GHz module to detect the presence and control the light, with no need to have separate presence detectors. Using breathing or heart rate detection, this system could even be used to keep an eye on the health of people.

Also, since the precise location of 60 GHz module in the office space is known due to the lighting commissioning step, this can be used to enable rather precise location awareness of stationary devices, mobile devices and/or people. Further, in embodiments, the information provided by the 60 GHz module 106 relating to the presence, location and/or activity of people, may also be used by the control unit of the light source 104 to change the operating state of the lighting device (e.g. switch on/off, setting brightness level, setting color, and/or setting color temperature, etc.). For example, this may enable very localized dimming of lights, and changing light settings based on people's presence and activity.

The 60 GHz module 106 in the luminaire 100 may be arranged to detect presence, such as detecting the location and/or activity of people, based on one or more of the following methods.

A first such method is to detect a 60 GHz-capable mobile device within range (which for 60 GHz typically implies line of sight), possibly with added detection of movement based on angle of beam-formed wireless signal. For example, consider now that the mobile device 200 shown in FIG. 2 represents a device of an end-user rather than a commissioning user. If the 60 GHz module 106 in the luminaire is able to receive a 60 GHz signal from the mobile device 200 (e.g. by polling it via the RF beam 110 or by receiving a signal broadcast by the mobile device 200), then it can be determined that a user is within range of not only the 60 GHz RF, but also the light beam 108. On this basis, the light may be automatically turned on.

A second method is to perform signal analysis of one or more 60 GHz wireless channels the 60 GHz module is operating on, comparing it to a set of reference signals obtained during a period of idle time (e.g. at night when no-one is present), in order to detect changes that indicate presence/movement of people. Whenever something changes in the RF environment, e.g. a person moves into the area or even simply breaths, the parameters for optimal connection between a 60 GHz transmitter and receiver changes. It is possible to detect from these changes whether a human is present or not. The so-determined presence of a human can be used to control the light.

Optionally, the signal analysis can be augmented by using 60 GHz beam-forming to receive and analyses signals obtained with different angles of the beam being formed. The signal analysis can be further augmented with signal analysis and control of other 60 GHz modules within the same office space, for example: 60 GHz modules in other lamps, a 60 GHz module of a mobile device 200 connected to the 60 GHz module in the lighting device, 60 GHz module of wireless docking station connected to the 60 GHz module in the lighting device.

A third method is to setup a wireless connection with the mobile device 200 via the 60 GHz RF, and use the connection to request its GPS information and/or other sensor information. The information received in this manner can then be used for presence, location and activity detection.

In yet another exemplary application of the luminaire 100, the radio beam 110 may be arranged to provide information about the region being illuminated by the light beam 108.

In this case, the 60 GHz radio beam 110 is directed towards a certain (pre-configured) fixed direction, aimed at a physical entity positioned at location (X, Y, Z) within the cone or lobe formed by the 60 GHz beam and within operating range of the 60 GHz Wi-Fi module 106. A portable device 200 with a 60 GHz receiver can then receive data pertaining to the physical entity at location (X, Y, Z) transmitted by the 60 GHz Wi-Fi module when it is placed within the cone or lobe formed by the 60 GHz beam.

This makes it very easy for a visitor or customer with a portable device 200 such as a smart phone or tablet with a 60 GHz receiver to start receiving data (e.g. text, images, video, audio) on a particular item when it is within the 60 GHz beam directed at that item, and so when the user is in very close proximity to it. In embodiments, the user does not have to select the correct web page for the item on display in front of the user, since the 60 GHz beam directed at that item only contains the information on the item.

For instance, shops, art shows, museums, etc. have usually items on display which should attract the attention of the customer or visitor. A sign or a poster with information is a low cost way of informing the customer/visitor about items on display, but also a static one. Updating it is costly, and showing real-time information is impossible this way. Putting an electronic display near each item would allow real-time information, but is costly and when the shop, art show, museum or gallery is reorganized, the displays with all their cabling have to be re-installed at the new item positions. A shop, art show, museum or gallery could have a barcode or QR code with URL printed near every item on display, which URL points to a web page of information on the item on display, but users need to be able to locate these labels so they need to be of a reasonable size and that may not be aesthetically pleasing anymore. Scanning these barcodes/QR codes requires various user actions. It also requires the user's mobile device to be connected to a Wi-Fi hotspot. So setting this up may be quite a complicated task for the user. If not connected to a Wi-Fi hotspot it furthermore may end up using the mobile device's 3G/4G data connection, which may incur some additional cost for the user. Therefore, the amount of data should be kept within certain limits.

Usually, the items on display are specially illuminated, e.g. by a spot light, in order to make them stand out or to be able to view them better. In accordance with embodiments of the present disclosure, the luminaire illuminating the item is a luminaire 100 with built-in 60 GHz RF transmitter. Since a 60 GHz connection typically can provide multi-gigabit connection speeds, the shop, art show, museum or gallery does not need to limit the amount of data to be sent, and hence the most beautiful high quality multimedia experience can be created on the user's mobile device. Also, because the light beam 108 is arranged to approximately coincide with the 60 GHz RF beam 108, the illuminated display region corresponds to the region where information on the displayed item is available. Further, setting this up will be quite simple task for the user—he or she need only place his or her device 200 near the item, beneath the illumination, and the 60 GHz RF signal will be available there.

A similar idea can also be applied to open-space flexible office buildings. An open-space flex office is an office with many desks that do not belong to a particular worker, but that can be allocated dynamically (also called "hot desking"). When an office worker enters the office (e.g. in morning or after a meeting), he should be able to easily determine if an empty desk is available or not. This could be done using a web page showing the plan of the building, all offices or floors in the building, the lay-out of each office and the position of all desks and whether the desks are available or reserved/in use and by whom. This is rather cumbersome for a person seeking his or an available desk and requires maps to be created and updated when offices/desks are re-organized. Note that simply seeing whether a person is using a desk is not always enough—an empty desk may have been reserved by a person who has not arrived yet or who is taking a break, or a person using a desk may not have reserved the desk.

More generally, the data provided within a certain 60 GHz beam 110 may contain any information (text, images, video, audio) about the item or region the 60 GHz beam is aimed at. This may be in the form of web pages or URLs to web pages, but could be in any format. A format in the form of a timed presentation or video would be one example that would be nice for the user, since the user does not have to browse through web pages on the item on display but can simply control the presentation or video with controls such as 'next', 'previous', 'start', 'pause' etc. The data to be provided about the item onto which the 60 GHz beam is aimed at, can either be cached in some local memory or the user's device, or be fetched from a server on the intranet or Internet. The link between the item and the data to be provided about the item may be pre-configured beforehand, for example by setting a unique identifier (e.g. URL) in a remote user interface (e.g. webpage) used to configure the 60 GHz module, or by equipping the 60 GHz with an RFID reader and holding an RFID or other near-field communication (NFC) tag related to the item near the RFID or NFC reader.

In one embodiment, the data is continuously broadcasted or multicasted by the 60 GHz module 106 as data frames on one or more 60 GHz wireless channels. A portable device capable of receiving 60 GHz signal can be configured to listen to these broadcasted or multicasted data frames and start presenting the data to the user. The data frames may contain a specific content identifier that the portable device can recognize for this purpose.

In a second embodiment, the data is provided by the 60 GHz module 106 as soon as it detects a 60 GHz capable portable device within the cone formed by the 60 GHz beam. A portable device equipped with a 60 GHz radio can be configured to automatically connect to the 60 GHz Wi-Fi module as soon as it is placed within the cone formed by the 60 GHz beam, after which the connection is used to transmit data. This may be an unsecure connection, or a partially secure connection using a well-known or fixed PIN in order to avoid user interaction that may otherwise be needed to pair the devices. The data could be transferred using protocols such as HTTP, FTP, NFS, SMB, or CIFS, or streamed over HTTP or UDP, or RTP connection. The 60 GHz module and the portable device may support DLNA, UPnP or a Wi-Fi service such as Miracast or Wi-Fi Direct Play service to enable this.

Note, the data may consists of external references, such as URLs that may be further retrieved through the 60 GHz connection between the portable device and 60 GHz module, or may be retrieved through any other communication channel available on the portable device (such as 3G/4G connection or 802.11n/ac connection). Furthermore, the data may be cached/stored on a storage unit in the portable device for later playback.

In embodiments, the angle and/or shape of the light cone 108 may further be automatically adjusted when the 60 GHz signal cone 110 changes or vice versa, and the 60 GHz Wi-Fi module and lighting device may have corresponding power states. This makes it clear to the user where to place his portable device to initiate a connection, and makes it easier to configure the system when a different physical entity needs to be highlighted.

In further embodiments, the 60 GHz module 106 may be is configured to receive data from a portable device equipped with a 60 GHz radio, enabling a return channel to operate a service provided through the 60 GHz module. For example, this could be useful for providing more personalized services, and enable a user e.g. to buy the item being highlighted, reserve a desk in a flex office, fetch additional data about the item, etc.

With regard to the direction of the beam, in one embodiment, the 60 GHz beam can be configured to be directed to a desired spot by placing a second 60 GHz module at the desired spot (inside or near the desired spot or holding a portable device close to the item) and setting up a link with the first 60 GHz module to be configured. A command is given to the first 60 GHz module to remember the setting of the antenna array for the link with the second 60 GHz radio, since the beam used for this connection is directed in an optimal fashion to the other radio with the beam-shaping control of the first 60 GHz module. The information to transmit about the item on display or at least an identifier of the item on display can also be transmitted together with the command. By building the second 60 GHz module into the item on display, the beam could automatically change its direction when the item is moved slightly (e.g. by a customer, after cleaning it, etc.).

Note, in embodiments a given 60 GHz module 106 may support multiple 60 GHz beams (in a time sharing fashion), and in this way may be used for pointing to multiple items simultaneously. An identifier of each item on display may identify which 60 GHz beam is being used for transmitting the information on the respective item.

Note also, in case multiple 60 GHz beams can be received by the portable device from one or more 60 GHz modules within range, because the beams are not narrow enough, the receiver in the portable device can be configured to select the strongest 60 GHz beam.

In a further embodiment, if a connection is made between the portable device and the 60 GHz module 106, the reliability of the connection may be improved by configuring the 60 GHz beam (and the light beam) to follow the portable device when it moves away slightly in order to keep connection, up to a certain threshold after which it returns to the initial (pre-configured) direction.

Some further optional features are now described, which may be used in relation to the various example applications discussed above or other applications.

In embodiments, the radio signal may comprise one or more of various types of information about the light source, the light beam and/or the light. E.g. such information could comprise: information for use in commissioning a lighting system comprising the luminaire (as discussed above), and/or an indication that the light beam is about to switch off within a predetermined time window.

Vice versa, the light beam may be arranged to provide various types of information about the radio module, the radio beam and/or the radio signal. E.g. the information provided by the light beam comprises one or more of: information for use in commissioning a communication system comprising the radio beam, information about the quality of the radio beam, whether the radio beam is currently available, and/or a password or other cryptographic information like a cryptographic key or certificate required for a user device to access a network via the radio module (e.g. which could be time-variable, say on a daily basis). Information may be included in the light either visually (to be seen by the human eye), or embedded in the light (modulated into the light at a frequency beyond human perception based on coded light techniques). In the latter case, the information may be detected by a user device 200 equipped with a light sensor such as a photocell or rolling-shutter camera and a suitable coded light detection algorithm.

For instance, the luminaire may be used to provide feedback on the 60 GHz availability to users. For example the simple fact that the light is present may indicate that 60 GHz Wi-Fi is also available in the same place, or a more complex signal (e.g. visual flashing or an embedded signal) could be given to indicate that the 60 GHz radio is turned on or off. In another example, the user receives visual or embedded feedback from the luminaire with regard to the connection quality, such as an indication of the signal-to-noise ratio (SNR) or received signal strength indicator (RSSI). E.g. the light may convey information in the hue of the light, with one hue indicating good SNR or RSSI and another hue indicating poor SNR or RSSI (either on a binary good/poor basis, or with one or a range of hues in between to indicate degrees of SNR or RSSI). For instance, in an integrated lamp/60 GHz AP, any parameter that is measured in the AP or 60 GHz transceiver may be output to the lamp, which then uses e.g. coded light to transmit that information.

In embodiments, the visual or embedded information provided by the light beam may be automatically switched off when a link is established between the radio module 106 and a wireless device 200, or when a link of greater than a threshold quality is established between the radio module 106 and a wireless device 200.

In embodiments, the luminaire 100 may comprise a local lighting control unit providing some or all of the lighting control functionality of the at least one controller 112 incorporated in the luminaire 100 itself, or on the same local lighting network. In further embodiments, both the 60 GHz module and lighting control unit may be connected to the same backend server, responsible for keeping track of the light states, location information (e.g. obtained during commissioning), and/or other parameters of the lights within an office space, and that may provide instructions to change light settings in an office space based on the available data. Thus the back-end server may implement part of the role of the at least one controller 112 shown in FIG. 1.

In further embodiments, both the 60 GHz module and the local control unit 112 of the light source 104 may be connected through the same Ethernet cable providing power-over-Ethernet. The information exchange between the 60 GHz module 106 and lighting control unit 112 may include KNX, DMX, BACNet, Lonworks or DALI messages.

In further embodiments, the lighting control unit 112 may provide information that is used by the 60 GHz module 106 to change the operating state of the 60 GHz module (e.g. add location information in its beacon frames based on the location information related to the lighting device).

In yet further embodiments, the 60 GHz module 106 provides a conduit for exchange of information between the lighting control unit 112 or backend server and a device 200 connected to the 60 GHz module 106. This may include one or more of the following. One example is to send notification to the device 200 connected to the 60 GHz module 106 that the light source 104 is about to switch off, in order for the user of the device to confirm that he or she wants or does not want the light source 104 to be switched off. Another example is to send information to the device 200 connected to the 60 GHz module 106 about which rooms (e.g. meeting rooms) are vacated and/or which (individual) working spots in the vicinity of a certain lighting device are currently not occupied, to make it easy for the user to find an empty room or working spot. Yet another example is to send commands from the device 200 connected to the 60 GHz module 106 to control the light settings of one or more luminaires 100 (e.g. the device 200 in this case could be a mobile phone, or a wireless docking station that provides control of light settings as a peripheral function to a device connected to the wireless docking station).

It will be appreciated that the above embodiments have been described only by way of example. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire comprising:
   a light source operable to emit a beam of light; and
   a radio module operable to emit a radio beam comprising a radio signal, using a frequency band within a range of 30 GHz to 300 GHz;
   wherein the light source and radio module are operable to emit the light beam and radio beam so as to be substantially coincident in space; and wherein the light source is configured to use the light beam to provide embedded information about the radio module, the radio beam and/or the radio signal.

2. The luminaire of claim 1, wherein the light source and radio module are arranged to emit the light beam and radio beam so to be substantially coincident in space, in that one or more of:
   the light beam and radio beam have parallel axes;
   by solid angle, the intersection of the light beam and the radio beam is at least 50% of the solid angle of the radio beam and at least 50% of the solid angle of the light beam;
   by cross-sectional area in a plane perpendicular to the axes of the beams, or by area on a surface upon which both beams are incident, the intersection of the light beam is at least 50% of the area of the radio beam and at least 50% of the area of light beam; and/or
   in a plane perpendicular to the axes of the beams or on a surface which upon both beams are incident, one of the light beam and the radio beam falls entirely within the area of the other.

3. The luminaire of claim 1, wherein:
   the light source and radio module are arranged so that the light beam and the radio beam are moved in unison, and/or
   the light source and radio module are operable to change the light beam distribution and the radio beam distribution in unison.

4. The luminaire of claim 1, wherein the radio signal comprises information about the light source, the light beam and/or the light.

5. The luminaire of claim 4, wherein said information comprises one or more of:
   information for use in commissioning a lighting system comprising the luminaire, and/or
   an indication that the light beam (108) is about to switch off within a predetermined time window.

6. The luminaire or system of claim 1, wherein the information provided by the light beam comprises one or more of:
   information for use in commissioning a communication system comprising the radiobeam,
   information about the quality of the radio beam, whether the radio beam is currently available, and/or
   a password and/or cryptographic information required for a user device to access a network via the radio module.

7. The luminaire or system of claim 6, wherein the information provided by the light beam is automatically switched off when a link is established between the radio module and a wireless device, or when a link of greater than a threshold quality is established between the radio module and a wireless device.

8. A system comprising the luminaire of claim 1, wherein the light beam is arranged to illuminate a region, and the radio signal in the radio beam provides information about the illuminated region.

9. The system of claim 8, wherein one of:
   the information provided by the radio beam comprises information about an occupancy and/or reserved occupancy of the region; or
   the region comprises a product display including a product illuminated by the light beam, and the information provided by the radio beam comprises information about the illuminated product.

10. A system comprising the luminaire of claim 1, wherein:
    the light beam is arranged to illuminate a region; and
    the system comprises a controller configured to detect presence in the region based on the radio beam, and to control the light beam in dependence on the detected presence.

11. A method of operating a luminaire, comprising:
    operating a light source of the luminaire to emit a beam of light; and
    operating a radio module of the luminaire to emit a radio beam comprising a radio signal, using a frequency band within a range of 30 GHz to 300 GHz; and
    using a spatial extent of the light beam to indicate an approximate spatial extent of the radio beam, or vice versa using a spatial extent of the radio beam to indicate an approximate spatial extent of the light beam;
    wherein the light beam provides embedded information about the radio module, the radio beam and/or the radio signal.

12. A method of commissioning a lighting system comprising a plurality of luminaires each operated according to claim 11, the method comprising:
    determining an approximate distribution of the radio modules and/or radio beams based on a detected distribution of the light beams, or determining an approximate distribution of the light sources and/or light beams based on a detected distribution of the radio beams.

13. The method of claim 12, wherein said determination comprises one of:
    determining an approximate spatial distribution of the radio beams based on a detected spatial distribution of the light beams;
    determining a distribution of addresses and/or locations of the radio modules based on a detected distribution of information provided by the light beams; or
    determining a distribution of addresses and/or locations of the light sources based on a detected distribution of the radio signals in the radio beams.

14. The method of claim 11, comprising:
    establishing a connection between a mobile device and the radio module, by moving the mobile device to a position indicated by the spatial extent of the light beam.

* * * * *